United States Patent [19]

Mesch et al.

[11] 4,104,517
[45] Aug. 1, 1978

[54] METHOD AND OPTICAL SYSTEM FOR AUTOMATIC PARALLAX DETERMINATION

[75] Inventors: Franz Mesch, Karlsruhe; Horst Moll, Blankenloch, both of Fed. Rep. of Germany

[73] Assignee: Ernst Leitz Wetzlar GmbH., Wetzlar, Fed. Rep. of Germany

[21] Appl. No.: 792,604

[22] Filed: May 2, 1977

[30] Foreign Application Priority Data

May 5, 1976 [DE] Fed. Rep. of Germany ....... 2619795

[51] Int. Cl.² .................................................. G01J 1/36
[52] U.S. Cl. ...................................... 250/204; 250/201; 354/25
[58] Field of Search ................ 250/201, 204; 354/162, 354/164, 25; 356/4

[56] References Cited

U.S. PATENT DOCUMENTS

| 3,906,389 | 9/1975 | Matsumoto et al. ............. 354/25 X |
| 4,002,899 | 1/1977 | Stauffer ................................ 250/201 |

*Primary Examiner*—Lawrence J. Dahl
*Attorney, Agent, or Firm*—Bacon & Thomas

[57] ABSTRACT

Disclosed is a method for automatically determining parallax in a stereoscopic system, comprising the steps of: passing at least two imaging light channels through a moving grating structure; converting the light rays into separate electrical signals after passage through the grating structure; subtracting one of the electrical signals from the other to produce a signal difference; differentiating one of the electrical signals to produce a differentiated signal; multiplying the signal difference by the differentiated signal to produce a first multiplied signal; and controlling the orientation of one of the imaging light rays in response to the multiplied signal. Also disclosed is our apparatus for carrying out this method.

21 Claims, 3 Drawing Figures

4,104,517

METHOD AND OPTICAL SYSTEM FOR AUTOMATIC PARALLAX DETERMINATION

BACKGROUND OF THE INVENTION

1. Field of the Invention

The present invention relates to a method for automatic parallax determination in connection with stereoscopic optical system preferably those having two eyepieces and having at least one movable grating structure in the imaging light path, such as is used in connection with a base range finder, for example, using electrical signals which are derived from differentiable luminous fluxes of such an optical system. The invention further relates to an optical system which is adapted for the application of such a method.

2. Description of the Prior Art

In stereoscopic optical systems, it is generally desirable that the parallax between two partial images be determined automatically. This is particularly so in the case of base range finders, or in connection with the analysis of aerial stereo photographs. Various systems for optical-electrical scanning and for the subsequent use or processing of the resulting electrical signals have already been suggested for these purposes.

Such a prior art system is shown in FIG. 1 of the drawing, where the fundamental wave of the resulting signals is being utilized. Two objective lenses 10 and 11, which define two light channels, project an image of an object (not shown) onto a grating structure 16, via the deflecting mirrors 12, 13, 14 and 15. The grating structure 16 is movable perpendicularly with respect to the optical axes 18 and 19 by means of a drive 17' which is controlled by a generator 17. In each optical axis is arranged a photoelectric receiver 20 or 21, respectively, which produces an electrical signal responsive to the light portions which have passed through the grating structure 16. To each of the two receivers 20 and 21 is connected a phase discriminator or comparator 22 or 23, respectively, which is controlled by means of a reference signal received from the generator 17, and the output of the discriminator 22 of the first light channel is connected to the drive 17' of the grating structure 16, via a control member 24. The exit of the discriminator 23 controls an adjustment mechanism 25, via a control member 26. The mechanism 25 provides mechanical means for pivoting the mirror 15 along the direction of the arrow as indicated.

The operation of the system of FIG. 1 is such that the first light channel determines the position phase differential and, with the aid of the control member 24, shifts the median position of the grating structure 16 until it reaches the point where the output signal of the phase discriminator 22 reaches zero. At this point, the phase discriminator 23 indicates the parallax. The control member 26 and the drive 25 for the mirror 15 serve to adjust the resultant parallax to zero.

One shortcoming of this prior art system is that it requires two feedback loops which are coupled over the grating structure.

In U.S. Pat. No. 3,710,124 is described a method which uses the fundamental wave and the second harmonic of the grating frequency. A shortcoming of the method disclosed in this patent, as can be demonstrated, is that the accuracy of the measurements obtainable is dependent upon the accuracy with which the amplification has been adjusted, and the latter, in turn, is influenced by the amplitudes of the fundamental wave and of the second harmonic.

SUMMARY OF THE INVENTION

Underlying the present invention is the primary objective of developing an improved method, as well as an optical system for its application, which are free of the shortcomings described hereinabove.

Furthermore, it is an object of the invention to provide a novel optical system which is less complex in structure and, consequently, less susceptible to malfunction, while producing signals which are better and/or can be used more easily.

In accomplishing the foregoing objects, there has been provided according to the invention a method for automatically generating an electrical signal corresponding to parallax in a stereoscopic system, comprising the steps of: passing at least two imaging light channels through a moving grating structure; converting the light channels into separate electrical signals after passage through the grating structure; subtracting one of the electrical signals from the other to produce a signal difference; differentiating one of the electrical signals to produce a differentiated signal; multiplying the signal difference by the differentiated signal to produce a first multiplied signal; and optionally controlling the orientation of one of the imaging light channels in response to the multiplied signal.

In accordance with an alternative embodiment of the invention, the method further comprises the steps of producing a reference signal responsive to the speed of movement of the grating structure; multiplying the first multiplied signal by the reference signal to produce a second multiplied signal; and carrying out the controlling step in response to the second multiplied signal. In either embodiment, the method can further comprise the step of smoothing the final multiplication signal.

According to another aspect of the invention, there is provided an apparatus for automatically operating an electrical signal corresponding to parallax in a stereoscopic system, comprising a movable grating structure; means for moving the grating structure; means for passing at least two imaging light channels through the moving grating structure; means for converting the light channels into separate electrical signals after passage through the grating structure; means for subtracting a first one of the electrical signals of the converting means from the other to produce a signal difference; means for differentiating the first electrical signal of the converting means to produce a differentiated signal; means for multiplying the signal difference from the subtracting means by the differentiated signal from the differentiating means to produce a first multiplied signal; and optionally, means for controlling the orientation of one of the imaging light channels in response to the multiplied signal.

According to the second embodiment of this apparatus, it may further comprise means for producing a reference signal responsive to the speed of movement of said grating structure; and means for multiplying the first multiplied signal by the reference signal to produce a second multiplied signal. In this embodiment, the optional control means operates in response to the second multiplied signal.

Further special objects, features and advantages of the invention will become apparent from the following description, when taken together with the accompanying drawings which illustrate several optical systems which are represented in the various figures.

DESCRIPTION OF PREFERRED EMBODIMENTS

Using a method of the general type which is described in the introductory paragraph of the application, the objectives of the present invention can be attained by subtracting two of the electrical signals obtained, differentiating one of the two signals, multiplying the signal resulting from the differentiation with the difference signal resulting from subtraction, and using the signal resulting from this multiplication to control an indicating device and/or a displacement device. Alternatively, the signal resulting from the multiplication may be further multiplied with a reference signal which is reflective to the speed of movement of the grating structure, and the signal resulting from the second multiplication is then used to control an indicating device and/or a servo arrangement. The signals resulting from multiplication may be smoothed with a smoothing filter.

The present invention also provides an optical system for carrying out of the proposed novel method, the system being characterized in that one of the electrical signals which are obtained by means of photoelectric receivers is fed to a differentiation stage and to a subtraction circuit, to the second output of which is fed the other electrical signal, and that a multiplication stage is connected behind the differentiation stage and behind the subtraction circuit, the exit signal of the multiplication stage being used to control an indication device and/or a servo arrangement which is connected to the multiplication stage.

Another embodiment of an optical system for the application of the novel method of the invention is characterized in that it includes an additional multiplication stage, one input of which receives the output signal of the first multiplication stage and the other input receives a reference signal reflecting the speed of motion of the grating structure, the output signal of the second multiplication stage being used to control an indicating device and/or a servo arrangement. The reference signal may be produced by means of either a differentiation stage, an additional scanning head, or a special signal generator. The second multiplication stage may be either a phase-sensitive rectifier, an electronic flip-flop, or a ring modulator. Behind the last multiplication stage may be arranged a suitable means for smoothing the output signal.

The advantages of the proposed novel method and optical systems for its use result primarily from the fact that only a single feedback loop is needed, and from the fact that this feedback loop has better dynamic characteristics. Only a minimal averaging time is required. No band passes are necessary. Rather, the proposed new methods are null methods which are known for their advantages in regard to systematic and random errors.

Figure 1:
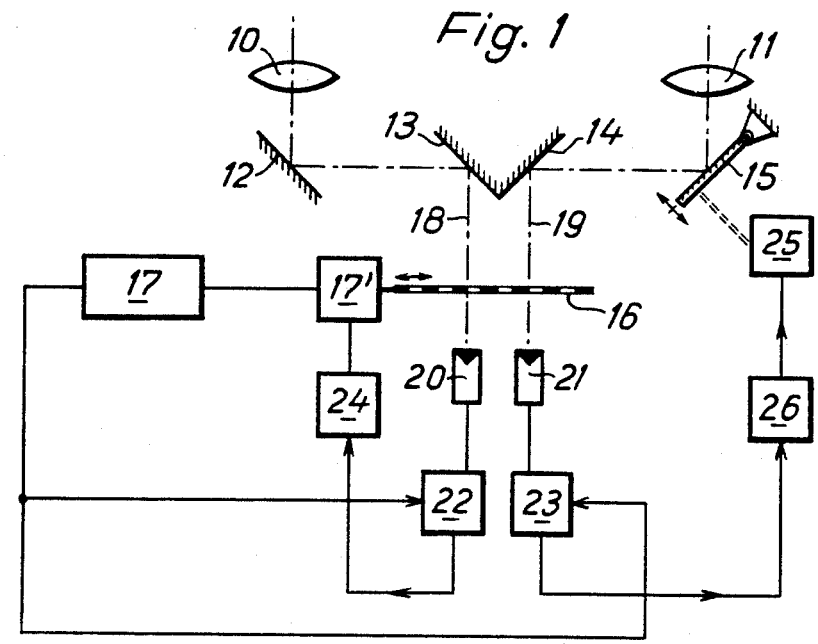
FIG. 1 shows a prior art optical system, designed for a known method of parallax determination.
Figure 2:
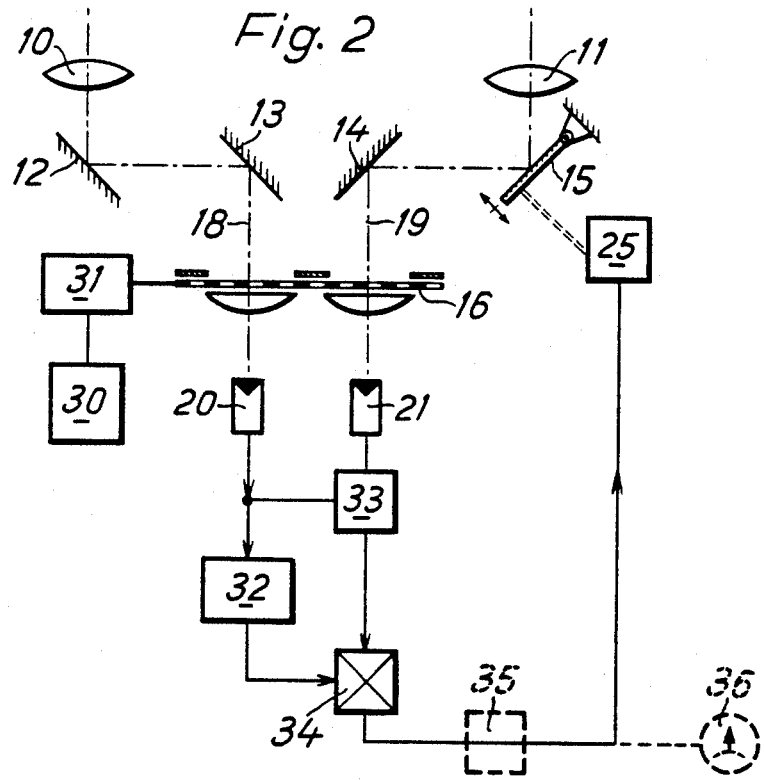
FIG. 2 shows a first embodiment of the optical system of the invention, designed for use in accordance with a first proposed method of parallax determination.

In FIG. 2 is illustrated an optical system which comprises two objective lenses 10 and 11 determining two light channels and projecting onto a grating structure 16 an image of an object (not shown in the drawing), via the deflecting mirrors 12 through 15. The grating structure 16 is moved perpendicularly to the optical axes 18 and 19 by means of a drive 31 which is controlled by a generator 30. In each of the two optical axes is arranged a photoelectric receiver 20 or 21, respectively, which produces an electrical signal indicative of the light portions which have passed through the grating structure 16. The output of receiver 20 is connected to the input of a differentiation means 32 and additionally to a subtraction means 33. The other receiver 21 has an output connected to a second input of the subtraction means 33. The output signals from the differentiation means 32 and the subtraction means 33 are fed as inputs to multiplication means 34, which provides output signals which control a servo arrangement 25 which is operatively connected for pivoting mirror 15. The exit signals from the multiplication stage 34 may optionally be treated in a smoothing means 35, prior to being fed to the servo arrangement 25. The output signals from multiplication means 34 are essentially parallax signals and may be fed to an indicating device 36 for display. This optical system requires that the movement of the grating structure 16 be uni-directional, i.e., non-reversible. Such a grating movement can be produced by means of a rotating grating disc, or by means of a rotating grating drum.

Figure 3:
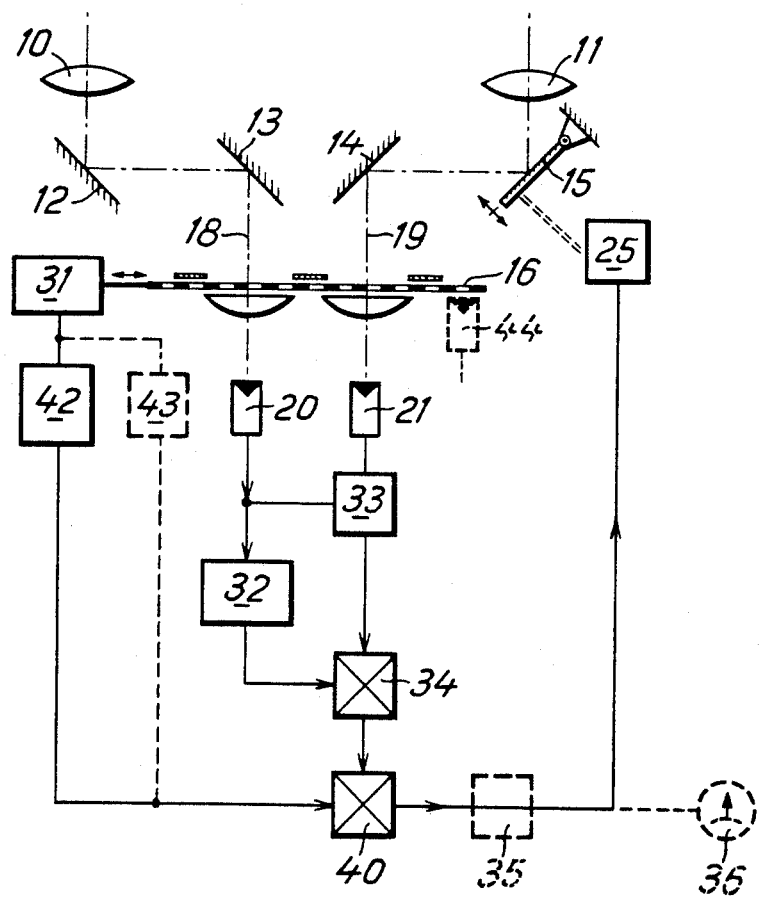
FIG. 3 shows a second embodiment of the optical system of the invention, designed for use in accordance with a second proposed method of parallax determination.

There are, however, situations where the use of a rotating grating structure would take up too much space within an apparatus or a sub-assembly thereof. Under these circumstances, it will be necessary to use a reciprocating grating structure which can be accommodated in a much smaller space. An optical system which permits the use of the novel method of the invention in conjunction with a reciprocating grating structure is illustrated in FIG. 3 in a schematic representation. The system of FIG. 3 differs from the system of FIG. 2 primarily in that a second multiplication means 40 is arranged to receive the output of the multiplication means 34. A second input of the second multiplication means 40 is provided by a reference signal which is proportional to the speed of movement of the grating structure 16. This signal can be generated in one of several ways: It is possible, for example, to provide the supply for the grating drive 31 by means of a generator 42 which has a second output supplying the reference signal in question. An alternative possibility, for example, indicated in dotted lines in FIG. 3, provides for the reference signal to be drawn directly from the supply signal of the grating drive 31, using a differentiation means 43. Lastly, it is also possible to produce the reference signals by means of an additional photoelectric receiver 44 which is directly associated with the grating structure 16 so as to scan the latter. The receiver 44 is likewise indicated in dotted lines.

As in the previously described embodiment, the signals obtained at the output of the second multiplication means 40 control a servo arrangement 25 which is operatively connected to a pivotable mirror 15. Again, a smoothing filter 35 may be arranged between the second multiplication means 40 and the servo arrangement.

The second multiplication stage 40 may take one of several forms: It may be in the form of an analog multiplier, it may, for instance, also be a phase-sensitive rectifier, an electronic flip-flop or a ring modulator.

What is claimed is:

1. A method for automatically generating an electrical signal corresponding to parallax in a steroscopic system, comprising the steps of:
    passing at least two imaging light channels through a moving grating structure;
    converting said light channels into separate electrical signals after passage through the grating structure;
    subtracting one of the electrical signals from the other to produce a signal difference;
    differentiating one of the electrical signals to produce a differentiated signal; and
    multiplying the signal difference by the differentiated signal to produce a first multiplied signal corresponding to the parallax.

2. The method as defined by claim 1, further comprising the steps of
    producing a reference signal responsive to the speed of movement of the grating structure; and
    multiplying the first multiplied signal by the reference signal to produce a second multiplied signal.

3. The method as defined in claim 1, further comprising the step of smoothing the first multiplication signal.

4. The method as defined in claim 2, further comprising the step of smoothing the second multiplication signal.

5. The method as defined by claim 1, wherein two imaging light rays are passed through the grating structure.

6. The method as defined by claim 1, further comprising the step of controlling the orientation of one of the imaging light channels in response to the multiplied signal.

7. A method for measuring distance, comprising the steps of automatically determining parallax by the method as defined by claim 1.

8. An apparatus for automatically generating an electrical signal corresponding to parallax in a stereoscopic system, comprising:
    a movable grating structure;
    means for moving said grating structure;
    means for passing at least two imaging light channels through said moving grating structure;
    means for converting said light channels into separate electrical signals after passage through said grating structure;
    means for subtracting a first one of the electrical signals of the converting means from the other to produce a signal difference;
    means for differentiating said first electrical signal of the converting means to produce a differential signal; and
    means for multiplying the signal difference from the subtracting means by the differentiated signal from the differentiating means to produce a first multiplied signal corresponding to the parallax.

9. The apparatus as defined by claim 8, further comprising means for controlling the orientation of one of the imaging light channels in response to the multiplied signal.

10. The apparatus as defined in claim 9, wherein said converting means includes a photoelectric receiver.

11. The apparatus as defined by claim 10, wherein said control means includes a servo mechanism.

12. The apparatus as defined in claim 10, wherein said control means includes an indicating device.

13. The apparatus as defined by claim 9, further comprising
    means for producing a reference signal responsive to the speed of movement of said grating structure; and
    means for multiplying the first multiplied signal by the reference signal to produce a second multiplied signal, and
    wherein said control means operates in response to the second multiplied signal.

14. The apparatus as defined by claim 13, wherein said reference signal producing means includes a differentiator associated with said grating moving means for differentiating a signal produced thereby.

15. The apparatus as defined by claim 13, wherein said reference signal producing means includes a photoelectric signal-producing means positioned adjacent said grating structure and being directly responsive to movement of said grating structure.

16. The apparatus as defined by claim 13, wherein said grating structure moving means includes a generator and wherein said reference signal producing means includes an output terminal of said generator.

17. The apparatus as defined by claim 13, wherein said second signal multiplying means comprises a phase-sensitive rectifier.

18. The apparatus as defined by claim 13, wherein said second signal multiplying means comprises an electronic flip-flop.

19. The assparatus as defined by claim 13, wherein said signal multiplying means comprises a ring modulator.

20. The apparatus as defined by claim 9, further comprising means for smoothing the first multiplied signal.

21. The apparatus as defined by claim 13, further comprising means for smoothing the second multiplied signal.

* * * * *